March 26, 1968 J. ELBLING 3,375,513

DIGITAL-TO-ANALOG CONVERTER

Filed March 5, 1965

INVENTOR.

JOSEPH ELBLING

BY

Shoemaker and Mattare

ATTYS.

3,375,513
DIGITAL-TO-ANALOG CONVERTER

Joseph Elbling, Ivrea, Italy, assignor to Ing. C. Olivetti & C., S.p.A., Ivrea, Italy, a corporation of Italy
Filed Mar. 5, 1965, Ser. No. 437,370
Claims priority, application Italy, Mar. 12, 1964, 5,811/64
5 Claims. (Cl. 340—347)

Figure 1A:
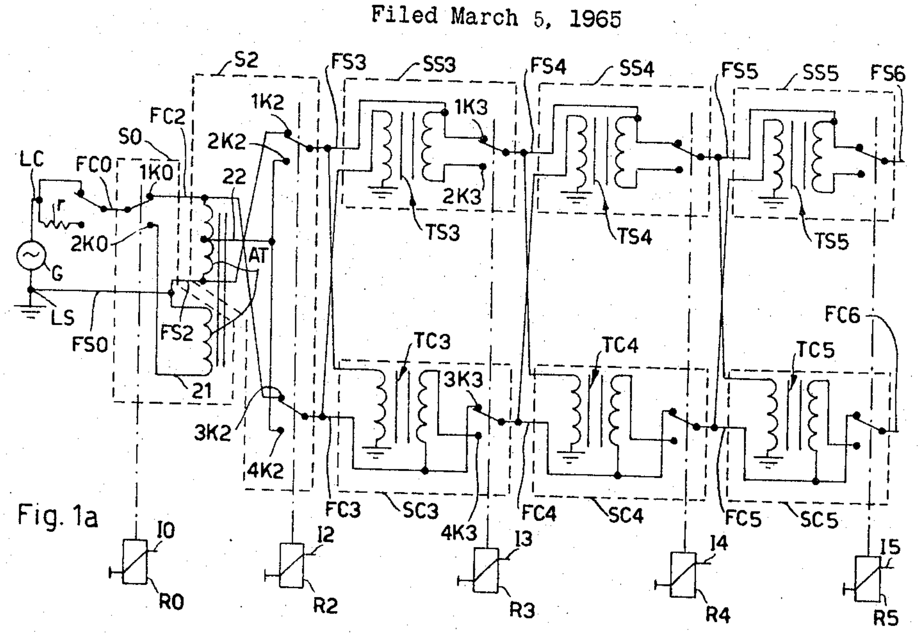

The present invention refers to a digital-to-analog converter, for instance for a machine-tool digital control device.

More particularly the invention relates to a digital-to-analog converter for supplying between two pairs of output terminals two voltages proportional respectively to the sine and the cosine of an angle represented by a binary number including $n$ input bits fed to $n$ input terminals.

In the known converters of this type, said output terminals are connected to two terminals of a voltage source through two circuits respectively, each one comprising a chain of $n$ stages corresponding to said $n$ input bits, each stage being adapted to vary the impedance between said source and said output terminals in order to increase the respective output voltages by a contribution depending on the corresponding input bit. Said binary converters, being made of a resistance network, exhibit insufficient accuracy and stability.

More accurate converters comprising in said stage a plurality of transformers have been proposed. However, in these transformer-type converters the input angle must be represented in decimal form. This entails a considerable complication, both in the structure of the devices for transferring said number from the storage or record member on which it is recorded to the converter, and in the preparation of said record member. Moreover, said decimal input converters present a disadvantage in that they include transformers incorporating secondary windings provided with a large quantity of taps, and multi-step selectors for the selection of said taps, and in that said numeric data must be supplied to the input of the computers in the form of groups of digits, each digit being represented by means of ten binary denominations. Therefore said known decimal converters involve the use of too many contacts and the reading of too long a code. Furthermore, the error induced by the inaccuracy of the transforming ratios affects all the values of the output voltages.

There has also been proposed a converter of the binary input type comprising a network of resistances, in which a greater accuracy is obtained in comparison with said decimal input converters, inasmuch as the contributions supplied by the input bits corresponding to the angles $\pi$, $\pi/2$ and $\pi/4$, are obtained only by means of switches which select different tap points, without the insertion of transformers or resistances. Said binary converter, however, implies that the input angles should be expressed in a cyclic binary code, which notoriously involves a serious complication of the arithmetical circuits processing the data to be fed to the converter.

These and other disadvantages are obviated by the digital-to-analog converter according to the invention, which is characterized in that said stage comprises a transformer adapted to be selectively inserted in said circuit under the control of the corresponding input bit, and in that said number is expressed in a pure binary code.

Figure 1B:
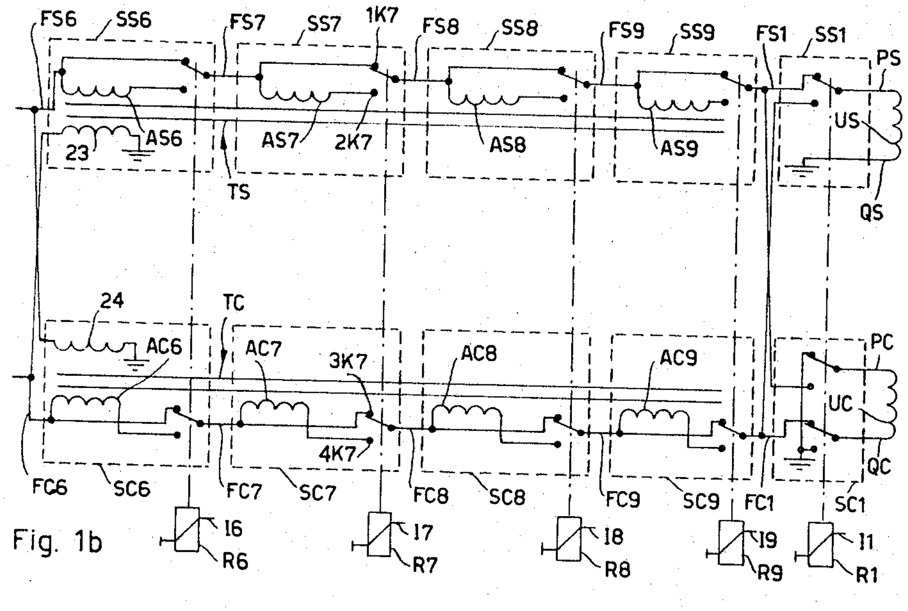
Figure 2:
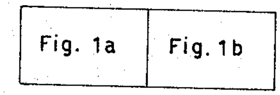

This and other characteristics, objects and features of the invention will be apparent from the following description, made by way of exemple and not in a limiting sense, of a preferred embodiment thereof, with reference to the accompanying drawings, wherein:

FIGS. 1*a* and 1*b* partially show a circuit diagram of the converter;

FIG. 2 shows how FIGS. 1*a* and 1*b* are to be composed.

As explained in a copending patent application No. 400,986 filed Oct. 2, 1964, a machine-tool digital control device may be controlled by a program recorded on a record member, e.g., a magnetic tape, said program comprising successive orders expressed by means of binary numbers each one including $n$ bits, which represent the successive positions of the movable element of the machine, e.g., the work-table, said orders being fed, through a digital-to-analog converter, to a servo-system controlling the position of said movable element.

The position of the movable element with respect to the fixed portion of the machine is detected and measured by means of a position measuring transformer of the type described, e.g., in the U.S.A. Patent No. 2,799,835, and comprising a fixed multipole winding and a pair of movable windings born by the movable element of the machine. Said relative position can be expressed as an angle, if the pole-pitch of the winding is made to correspond to the $2\pi$ radian angle. As explained in the aforesaid patent application, said position measuring transformer is provided with two inputs, which must be fed by two alternating voltages having the same phase, a frequency of, e.g., 10 kHz. and a maximum amplitude proportional respectively to the sine and cosine of said angle corresponding to the positional order.

The present invention may be embodied in the above mentioned digital-to-analog converter, which is adapted to convert each binary number representing a position into two analog magnitudes, representing respectively the sine and the cosine of the angle corresponding to said position.

More particularly, each positional order consists of a binary number, including, e.g., ten bits B0 to B9 which, according to a characteristic feature of the above mentioned patent applications, are processed in parallel.

Said ten input bits B0 to B9 represent a position expressed as an angle, in the sense that a generic angle A less than $2\pi$ radians is represented as a sum of partial angles, accordang to the formula:

$$A=B0\cdot\frac{\pi}{2^0}+B1\cdot\frac{\pi}{2^1}+\ .\ .\ .\ +Bm\cdot\frac{\pi}{2^m}+\ .\ .\ .\ +B9\cdot\frac{\pi}{2^9} \qquad (1)$$

In other words, angle A is expressed as a sum of the successive fractions of the angle $\pi$ according to the successive powers of two, each one multiplied by a coefficient which can have the values 1 or 0, and which therefore can be represented by means of the corresponding input bit. It is evident that by means of the ten input bits it is possible to represent all the successive angular positions comprised between 0 and $$\frac{1023}{1024}\cdot 2\pi$$

and spaced by a minimum distance equal to $2\pi/1024$. In other words, the input bits B0 to B9 in the Formula 1 are given the weights $\pi/2^0$ to $\pi/2^9$ respectively, said respectively, said weights corresponding to the product of said minimum distance $2\pi/1024$ by the decreasing powers of two, $2^9$ to $2^0$.

The Formula 1 maybe written as follows:

$$A=\frac{2\pi}{1024}\cdot(B9\cdot 2^0+B8\cdot 2^1+\ .\ .\ .\ +Bm\cdot 2^m+\ .\ .\ .\ +B0\cdot 2^9) \qquad (2)$$

Therefore, if the ten bits B9 to B0 are interpreted as the successive bits of a pure binary coded number, the nature of the correspondence between angular positions and input numbers appears to be a direct proportionality.

The converter comprises, for each one of the ten bits of the input number, i.e., for each one of the ten coefficients B0 to B9 of the preceding formulae a relay R0 to R9 (FIGS. 1*a* and 1*b*) which is adapted to be energized by the signal representing the corresponding input bit. More particularly, said relay is either energized or not depending on whether said bit has value 1 or 0, so that the contacts of said relay are adapted respectively either to connect or not appropriate impedance elements between a source of voltage G and two pairs of output terminals PS, PC and QS, QC of the converter, in order to vary the output voltages of the converter by a contribution depending on said bit. The two windings US and UC of the position measuring transformer are connected to the pairs of output terminals PS, QS, respectively PC, QC, of the digital-to-analog converter. Therefore said windings US and UC are fed by said voltages proportional respectively to the sine and the cosine of angle A represented, according to Formula 1, by means of a binary number including $n=10$ bits supplied on input terminals 10 to 19.

The voltage source G (FIG. 1*a*), consisting of a sinusoidal oscillator having a frequency of e.g. 10 kHz., is adapted to supply between its terminals LC and LS a voltage proportional to cos 0, i.e., to supply on said terminals two voltages proportional to cos 0, respectively sin 0, with respect to ground.

Terminals LS, LC of source G are connected with output terminals PS, QS and PC, QC of the converter through two circuits, each one comprising a chain of $n=10$ stages corresponding to said ten input bits B0 to B9 respectively. More particularly terminal LS is connected to output terminals PS, QS of the converter through a first chain of stages comprising stages S0, S2, SS3, SS4, SS5, SS6, SS7, SS8, SS9, SS1, corresponding respectively to the input bits B0, B2, B3, B4, B5, B6, B7, B8, B9, B1 and, similarly, terminal LC is connected to output terminals PC, QC of the converter through a second chain of stages comprising stages S0, S2, SC3, SC4, SC5, SC6, SC7, SC8, SC9, SC1, corresponding respectively to the input bits B0, B2, B3, B4, B5, B6, B7, B8, B9, B1, stages S0 and S2 being common to said first and second chain. Each one of these stages has the input coinciding with the output of the next preceding stage in the relative chain, and works so as to vary the impedance between each one of said two pairs of output terminals PS, QS and PC, QC, and said terminals of source LC, LS by a quantity depending on the weight ($\pi/2^0$ to $\pi/2^9$) of the corresponding input bit B0 to B9.

Accordingly, each stage is adapted to supply to the output voltages of the converter a contribution depending on the value of the corersponding input bit.

Stage S0, corresponding to bit B0 supplied on input terminal I0, has inputs FC0 and FS0 directly connected to terminals LC, respectively LS, of source G, and comprises a permanent direct connection between its input FSO and its output FS2. Contact 1K0 of relay R0 is directly connected to output FC2 of stage S0, whereby input FC0 of said stage is directly connected to output FC2 when the input bit B0 has the value 0. Contact 2K0 of relay R0 is connected to the terminal 21 of an autotransformer AT, in which the number of turns inserted between terminals 21 and FS2 is equal to the number of turns inserted between terminals FS2 and FC2. When said input bit B0 has the value 1, input FC0 is connected to terminal 21 of the autotransformer, whereby the voltage applied on output FC2 is equal in magnitude and opposite in sign with respect to the case in which B0 has value 0. In other words, stage S0 receives, on inputs FC0 and FS0, two voltages equal respectively to cos 0 and sin 0 and supplies, on outputs FC2 and FS2, two voltages which, if $B0=0$, are again equal respectively to sin 0 and cos 0, but which, if $B0=1$, are instead equal to $\cos(0+\pi)$ and respectively $\sin(0+\pi)$. In other words, said stage S0 supplies, in each instance, on its outputs FS2, FC2, the two magnitudes $\sin(B0\cdot\pi)$ respectively $\cos(B0\cdot\pi)$.

It is therefore clear that stage S0 is adapted to supply to the output voltage of the converter a contribution depending on the corresponding input bit B0.

Stage S2 corresponding to bit B2 supplied on input terminal I2 includes direct connections between input terminal FC2 and contact 3K2 of relay R2, between input terminal FS2 and contact 1K2 of relay R2 and between an intermediate tap 22 of autotransformer AT and contacts 2K2 and 4K2 of said relay. Said intermediate tap 22, acting as an intermediate terminal of source G, is arranged so that the voltage between it and input FS2 bears, with respect to the voltage between inputs FC2 and FS2, the same relation as $$\cos\frac{\pi}{4} \text{ to } \sin 0$$

When input bit B2 has value 0, outputs FS3 and FC3 of stage S2 are connected respectively to contact 1K2 and 3K2, whereas when said bit has value 1, said outputs are connected respectively to contacts 2K2 and 4K2. Therefore, it is apparent that stage S2, upon receiving on its inputs FC2 and FS2 two voltages equal respectively to cos H2 and sin H2, is apt to supply on outputs FS3 and FC3 either two voltages equal to sin H2, respectively cos H2 when bit B2 is equal to 0, so that relay R2 is deenergized, or two voltages equal respectively to $$\sin\left(H2+\frac{\pi}{4}\right) \text{ and } \cos\left(H2+\frac{\pi}{4}\right)$$

when bit B2 is equal to 1 and, therefore, relay R2 is energized. Since stage S2 is connected to stage S0, H2 is equal to $B0\cdot\pi$. Therefore, said stage S2 supplies, in any case, on its outputs FSS, FC3, the two magnitudes:

$$\sin\left(B0\cdot\pi+B2\cdot\frac{\pi}{4}\right)$$

respectively $$\cos\left(B0\cdot\pi+B2\cdot\frac{\pi}{4}\right)$$

Accordingly, it is apparent that also stage S2 is adapted to supply to the output voltages of the converter a contribution depending on the corresponding input bit B2.

Each one of the remaining input bits B1, B3, B4, B5, B6, B7, B8, B9 is similarly adapted to control two different stages belonging respectively to the above mentioned first or second chain of stages.

More specifically, said two chains comprise stages of a first type, such as stages SS3, SS4, SS5, respectively SC3, SC4, SC5. The pairs of stages SS3 and SC3, SS4 and SC4, SS5 and SC5, corresponding to bits B3, B4, respectively B5, have a similar structure and operation.

A generic pair of stages of this first type, SS*m*, SC*m*, corresponding to the input bit B*m*, is apt to supply a contribution to the output voltages of the converter because, upon supplying on its inputs FS*m*, FC*m* two voltages equal to the sine, respectively the cosine, of an angle H*m*, its outputs $FS(m+1)$ and $FC(m+1)$ supply two voltages approximately equal to the sine, respectively to the cosine, of angle $$Hm+Bm\cdot\frac{\pi}{2^m}$$

By examining in more details one of these pairs of stages of the first type, e.g. the pair of stages SS3, SC3, it is apparent (FIG. 1*a*) that each stage comprises a transformer TS3, respectively TC3, having a transforming ratio equal to $$\tan\frac{\pi}{2^3}$$

respectively $$-\tan\frac{\pi}{2^3}\left(\tan\frac{\pi}{2^m}\text{ respectively}-\tan\frac{\pi}{2^m}\right)$$

for the generic pair of stages SS*m*, SC*m*.

The primary winding of transformer TS3, TC3 is directly connected to input FC3, respectively FS3, of the other stage SC3, SS3 of the pair, whereby it is fed by a voltage equal to cos $H3$, respectively sin $H3$, with respect to ground. Therefore, a voltage equal to $$\tan\frac{\pi}{2^3}\cdot\cos H3$$

respectively $$-\tan\frac{\pi}{2^3}\cdot\sin H3$$

is obtained between the terminals of the secondary winding of transformer TS3, TC3. Furthermore, one terminal of the secondary winding of transformer TS3, TC3, is directly connected to input FS3, respectively FC3, of stage SS3, respectively SC3, whilst, the other terminal is connected to a fixed contact 2K3, respectively 4K3, of relay R3.

Therefore, on said contact 2K3, 4K3 there will be, with respect to ground, a voltage proportional to $$\sin H3+\cos H3\cdot\tan\frac{\pi}{2^3}$$

respectively $$\cos H3-\sin H3\cdot\tan\frac{\pi}{2^3}$$

Accordingly, when relay R3 is energized, so that the outputs of stages SS3 and SC3 are connected to contacts 2K3 and 4K3 respectively, said outputs have applied thereto a voltage equal to $$\sin\left(H3+\frac{\pi}{2^3}\right)\sec\frac{\pi}{2^3}$$

respectively $$\cos\left(H3+\frac{\pi}{2^3}\right)\cdot\sec\frac{\pi}{2^3}$$

Moreover, input FS3, FC3 is directly connected to a contact 1K3, respectively 3K3. Therefore a voltage equal to sin $H3$, respectively cos $H3$ will be available on this contact. Accordingly, when relay R3 is deenergized, so that outputs FS4, FC4, of stages SS3, respectively SC3 are connected to contacts 1K3, respectively 3K3, on said outputs there is present a voltage equal to sin $H3$, respectively cos $H3$.

It is therefore clear that inputs FS3, FC3, are connected to the outputs FS4, respectively FC4, either directly, when input bit B3 has value 0, or through transformers TS3, respectively TC3, when said bit has value 1. Therefore, the pair of stages now considered is apt to supply the magnitudes $$\sin H3+\cos H3\cdot\tan B3\frac{\pi}{2^3}$$

respectively $$\cos H3-\sin H3\cdot\tan B3\frac{\pi}{2^3}$$

and, similarly, the generic pair of stages SS$m$, SC$m$, is apt to supply the magnitude $$\sin Hm+\cos Hm\cdot\tan Bm\frac{\pi}{2^m}$$

respectively $$\cos Hm-\sin Hm\cdot\tan Bm\frac{\pi}{2^m}$$

On the other hand, we have:

$$\sin\left(Hm+Bm\frac{\pi}{2^m}\right)=\sin Hm\cdot\cos Bm\frac{\pi}{2^m}+\cos Hm\cdot\sin Bm\frac{\pi}{2^m}\quad(3)$$

$$\cos\left(Hm+Bm\frac{\pi}{2^m}\right)=\cos Hm\cdot\cos Bm\frac{\pi}{2^m}-\sin Hm\cdot\sin Bm\frac{\pi}{2^m}\quad(4)$$

and, with the approximation $$\sec\frac{\pi}{2^m}=1$$

$$\sin\left(Hm+Bm\cdot\frac{\pi}{2^m}\right)=\sin Hm+\cos Hm\cdot\tan Bm\frac{\pi}{2^m}\quad(5)$$

$$\cos\left(Hm+Bm\cdot\frac{\pi}{2^m}\right)=\cos Hm-\sin Hm\cdot\tan Bm\frac{\pi}{2^m}\quad(6)$$

It is clear that, within the limits of the above mentioned approximation $$\sec\frac{\pi}{2^m}=1$$

a pair of stages SS$m$, SC$m$ of the type herein considered is apt to provide simultaneously on its outputs the magnitudes $$\sin\left(Hm+Bm\cdot\frac{\pi}{2^m}\right)$$

respectively $$\cos\left(Hm+Bm\cdot\frac{\pi}{2^m}\right)$$

when the magnitudes sin $Hm$, respectively cos $Hm$ are simultaneously applied to the respective inputs.

Since, as already stated and as shown in the figures, in each chain the output of each stage coincides with the input of the next following stage, said angle H$m$ is $$H3=B0\cdot\pi+B2\cdot\frac{\pi}{4}$$

for the pair of stages SS2, SC2, because, as already seen, the pair of stages SS2, SC2 is apt to supply, on its outputs, the magnitudes $$\sin\left(B0\cdot\pi+B2\cdot\frac{\pi}{4}\right)$$

and $$\cos\left(B0\cdot\pi+B2\cdot\frac{\pi}{4}\right)$$

Likewise we shall have:

$$H4=B0\cdot\pi+B2\cdot\frac{\pi}{4}+B3\cdot\frac{\pi}{8}$$

and $$H5=H4+B4\cdot\frac{\pi}{16}$$

It is therefore clear that on output lines FS6 and FC6 there are obtained two voltages equal—within the limits of the already seen approximations—respectively to sin $H6$ and cos $H6$, where:

$$H6=B0\cdot\pi+B2\cdot\frac{\pi}{4}+B3\cdot\frac{\pi}{8}+B4\cdot\frac{\pi}{16}+B5\cdot\frac{\pi}{32}$$

From the foregoing it is apparent that also stages SS3, SS4, SS5, SC3, SC4, SC5, are apt to supply to the output voltages of the converter a contribution depending on the corresponding input bit.

In the described embodiment there is also shown (FIG. 1*a*) a compensating resistance $r$, which may be connected in series with the voltage source G by means of a further movable contact of relay R3. When input bit B3 is equal to 1, the above mentioned resistance is therefore switched on in order to compensate for the error due to the approximation $$\sec \cdot \frac{\pi}{8} = 1$$

introduced, as already seen, by the pair of stages SS3, SC3.

For the pairs of stages SS4, SC4 and SS5, SC5, corresponding to partial angles equal to $\pi/16$, respectively $\pi/32$, the compensation does not take place, inasmuch as the error introduced by the approximations $$\sec \frac{\pi}{16} = \sec \frac{\pi}{32} = 1$$

may be regarded as negligible. Input bits B6, B7, B8, B9, which belong to denominations below $m=5$ and are supplied to input terminals 16 to 19 respectively, represent partial angles $\pi/64$, $\pi/128$, $\pi/256$, $\pi/512$ respectively, for which the approximation:

$$\tan Bm \cdot \frac{\pi}{2^m} = Bm \cdot \frac{\pi}{2^m}$$

is found to be valid.

These bits B6 to B9 control the pair of stages SS6 and SC6, SS7 and SC7, SS8 and SC8, SS9 and SC9, respectively, which are of a second type. A transformer TS, is provided with a primary winding 23 common to all the stages SS6, SS7, SS8, SS9 of the first chain and fed from output FC6 of the next preceding stage SC5 belonging to the other of said chains and with a separate secondary winding AS6, AS7, AS8, AS9 for each stage respectively.

The stages SS6, SS7, SS8, SS9 are similar to each other. Likewise, a transformer TC is provided with a primary winding 24 common to all the stages SC6, SC7, SC8, SC9 of the second chain and fed from output FS6 of the next preceding stage SS5 belonging to the other of said chains, and with a separate secondary winding AC6, AC7, AC8, AC9, respectively for each stage. Also the stage SC6, SC7, SC8, SC9 are similar to each other.

By examining more particularly the pair of stages SS7, SC7, it is apparent that input FS7, respectively FC7, is directly connected to fixed contact 1K7, respectively 3K7, of relay R7 and, through secondary windings AS7, respectively AC7, to fixed contact 2K7, respectively 4K7, of said relay.

The transforming ratio of secondary winding AS7 of stage SS7 to primary winding 23 of transformer TS is equal to $$\frac{\pi}{2^7} \left( \frac{\pi}{2^m} \text{ for the generic stage SS}m \right)$$

The transforming ratio of secondary winding AC7 of stage SC7 to primary winding 24 of transformer TC has the same value and opposite sign. It is therefore clear that stage SS7, SC7, upon receiving on input FS7, respectively FC7, a voltage equal to sin $H7$, respectively cos $H7$, is apt to supply to output FS8, respectively FC8, either a voltage equal to $$\sin H7 + \frac{\pi}{2^7} \cdot \cos H6$$

respectively $$\cos H7 + \frac{\pi}{2^7} \cdot \sin H6$$

if input bit B7 is equal to 1 (so that relay R7 is energized), or a voltage equal to sin $H7$, respectively cos $H7$ if said bit is equal to 0 (so that said relay is deenergized).

Therefore, said pair of stages SS7, SC7, is apt to supply the magnitudes $$\sin H7 + B7 \cdot \frac{\pi}{2^7} \cdot \cos 6$$

and, respectively, $$\cos H7 - B7 \cdot \frac{\pi}{2^7} \cdot \sin H6$$

The function of the remaining pair of stages SS6, SC6, SS8, SC8, SS9, SC9 of this second type is similar to the one just described for the pair of stages SS7 and SC7, so that the generic pair of stages SS$m$, SC$m$ of this second type is apt to supply on its outputs the magnitudes $$\sin Hm + Bm \cdot \frac{\pi}{2^m} \cdot \cos H6$$

and $$\cos Hm + Bm \cdot \frac{\pi}{2^m} \cdot \sin H6$$

If the further approximations:

$$\tan \left( Bm \cdot \frac{\pi}{2^m} \right) = Bm \frac{\pi}{2^m}$$

sin $H6$=sin $Hm$ and cos $H6$=cos $Hm$ are introduced into Formulae 5 and 6, it appears that also said pair of stages is apt to supply the magnitudes $$\sin \left( Hm + Bm \cdot \frac{\pi}{2^m} \right)$$

respectively $$\cos \left( Hm + Bm \cdot \frac{\pi}{2^m} \right)$$

It is therefore clear that each stage SS6, SS7, SS8, SC6, SC7, SC8, is apt to supply to the output voltages of the converter a contribution depending on the corresponding input bit.

Since, as already stated, the inputs of the pair of stages SS6, SC6 coincide with the outputs of the next preceding pair of stages SS5, SC5, angle H6 is equal to $$B0 \cdot \pi + B2 \cdot \frac{\pi}{4} + B3 \cdot \frac{\pi}{8} + B4 \cdot \frac{\pi}{16} + B5 \cdot \frac{\pi}{32}$$

Likewise, since the successive couples of stages SS7, SC7, SS8, SC8, SS9, SC9 are connected in chain as already explained, we have:

$$H7 = H6 + B6 \cdot \frac{\pi}{64};\ H8 = H7 + B7 \cdot \frac{\pi}{128} \text{ and } H9 = H8 + B8 \cdot \frac{\pi}{256}$$

With reference to relations (5) (6) (7), it is therefore apparent that the voltages present on outputs FS1 and FC1 are equal to $$\sin \left( H9 + B9 \cdot \frac{\pi}{512} \right)$$

respectively $$\cos \left( H9 + B9 \cdot \frac{\pi}{512} \right)$$

where H9 has the above specified value.

The input bit B1, supplied on input terminal I1, controls stages SS1, SC1. Stage SS1 is apt to connect output terminal PS to either input FS1 or input FC1, according to whether relay R1 is energized or not, whereas output terminal QS is permanently connected to ground. Stage SC1 is apt to connect the two output terminals QC and PC either to input FC1, respectively to ground, if said relay R1 is deenergized, or to earth, respectively to input FS1, if said relay is energized.

Therefore stage SS1, SC1, upon receiving on input FS1, respectively FC1, a voltage equal to sin $H1$, respectively cos $H1$, is apt to supply, between output terminals PS and QS, respectively QC and PC of the converter, either a voltage equal to cos $H1$, respectively sin $H1$, if relay R1 is energized, or a voltage equal to sin $H1$, respectively cos $H1$, if relay R1 is deenergized.

In view of the fact that $$\cos H1=\sin\left(H1+\frac{\pi}{2}\right)$$

and $$-\sin H1=\cos\left(H1+\frac{\pi}{2}\right)$$

it is apparent that the pair of stages SS1, SC1 is apt to supply to said output terminals of the converter two voltages equal to $$\sin\left(H1+B1\cdot\frac{\pi}{2}\right)$$

and, respectively, to $$\cos\left(H1+B1\cdot\frac{\pi}{2}\right)$$

Since the inputs of stages SS1 and SC1 are connected to the outputs of stages SS9, respectively SC9, said angle H1 will be equal to $$H9+B9\cdot\frac{\pi}{512}$$

Accordingly, also this last pair of stages supplies to the output voltages of the converter a contribution depending on the value of the corresponding bit B1, so that, ultimately, windings US and UC of the position measuring transformer are fed with voltages equal respectively to sin $A$ and cos $A$, where $$A=H1+B1\cdot\frac{\pi}{2}$$

is the angle defined in Formula 1 and corresponding to the number to be converted.

It has been previously observed that there is a direct proportionality between angular positions and input numbers fed to the converter. This, as already intimated, involves considerable advantages in the preparation of the tape carrying the positional orders represented by said input numbers, inasmuch as the processing of said orders, which entails performing arithmetic operations on numbers represented in a pure binary code instead of numbers in another binary code, is much more economical.

More particularly, should a cyclic binary code be used in the representation of the angle, as in the known converters already mentioned, it would be necessary to insert an expensive and complicated decoder between the tape recorder and the computer preparing the positional orders and operating economically according to the pure binary code.

Moreover, should the machine-tool control unit be provided with a device for compensating the variations in the radius of the tool, as described, for instance, in USA patent No. 3,103,614, wherein each one of the machine-tool control units is combined with an arithmetic processing device inserted between the tape reader and the digital-to-analog converter, said decoder should be located on the output of said processing device in each of the control units of the various machine tools, instead of being provided only once on the output of the computer which, being one only for several machines, prepares the program tape, so that a further increase in cost would be incurred.

The advantage offered by the device according to the vention is made still more evident by the fact that it makes possible a simple direct connection between each reading transducer of a track of the program tape and a corresponding input relay of the digital-to-analog converter, whilst every other known device calls for the insertion of suitable decoders, which are mostly complicated because they require also partially storing the data to be passed on to the converter.

It should, moreover, be noted that, in general, in converters comprising two chains of stages each one giving its own contribution to the output voltage, the contribution of each stage is supplied with a certain error. More particularly, said error depends either on the inaccuracy of the components used in the stage (e.g., on the inaccuracy of the resistances in resistance-type converters, or on the inaccuracy of transforming ratios and position of the taps in transformer-type converters) or on the mathematical approximations introduced into the trigonometrical formulae mechanized by said stage.

The converter according to the invention allows the first cause of errors to be reduced, inasmuch as in the stages corresponding to bits B2 to B9 it uses transformers which can intrinsically be realized with a greater accuracy than the resistances and inasmuch as in said transformers it requires a number of taps substantially reduced in comparison with the transformer-type converters of the known type. Furthermore, it allows both the first and the second cause of errors to be substantially reduced, because the contributions of the stages corresponding to bits B0 and B1 are supplied without errors on account of the fact that they involve only the use of switches.

More particularly, since the errors introduced by the individual stages accumulate, it is clear that, if successive positions A increasing from 0 to $2\pi$ are considered, the converter according to the invention supplies the corresponding output sin $A$ and cos $A$ without error when position A corresponds to one of the angles equal to the successive multiples of $\pi/8$ and with an error increasing from zero to a maximum upon varying said position between two successive multiples.

On the contrary, in the known transformer-type converters, which, as already stated, call for a decimal input, said error increases continually at least up to angle $\pi/2$, so that, with equal accuracy of the components, the average error in the output voltages is found to be greater.

In the special application here considered, the converter is used for feeding a position measuring transformer of the above described type, which is inserted in the servo-mechanism controlling a machine tool and is therefore certainly used under such conditions that it gives an output signal close to zero. It is notorious that in position measuring transformers of the above type, it is not necessary that the values sine $A$ and cos $A$, feeding the windings US and UC, should be individually accurate, the accuracy of their ratio being sufficient. Therefore, in the particular applications herein referred to, the approximation $$\sec.\ \frac{\pi}{2^m}=1$$

introduced into the stages corresponding to input bits B3 to B9 does not give rise to appreciable errors because, as appears from the preceding formulae, it modifies both outputs of the converter on the basis of the same coefficient of proportionality.

As explained in the above mentioned patent application, the voltage source G feeding the converter consists of an oscillator so controlled as to produce intermittent trains of oscillations. Each one of said trains, consisting e.g. of five oscillations, begins when the oscillator receives a strobe signal after all the contacts of relays R0 to R9 have been positioned according to the values of the corresponding input bits, so that all the contacts of the converter are always opened or closed with no current flowing therethrough.

It is intended that many changes, additions of parts and improvements may be made to the above described converter without departing from the scope thereof and that the converter may be applied in fields other than digital control of the machine tools e.g., in the field of electronic computers.

I claim:

1. A digital-to-analog converter comprising:

(a) $n$ input terminals for receiving a group of $n$ bits representing in pure binary code a number to be converted, said number representing an angle equal to the sum of partial angles represented by said bits respectively, (b) an ordered group of $n$ sine stages associated with said input terminals respectively and each one having an input and an output and including transformer means, (c) an ordered group of $n$ cosine stages associated with said input terminals respectively and each one having an input and an output and including transformer means, (d) means for connecting the input of said sine and cosine stage to the output of the next preceding sine and cosine stage respectively, (e) a relay connected to each input terminal for being energized according to the value of the bit signal received thereon, (f) switching means in said sine and cosine stage operated by said relay and modifying said transformer means for varying the impedance between the corresponding input and output an amount corresponding to the relevant partial angle, (g) a sine output terminal and a cosine output terminal, (h) a source of alternate current having a first and second output terminals, (i) means for connecting the output of the last sine and cosine stage to said sine and cosine output terminal respectively, (j) and means for connecting the input of the first sine and cosine stage to said first and second output terminals respectively.

2. A digital-to-analog converter comprising:

(a) $n$ input terminals for receiving a group of $n$ bits representing in pure binary code a number to be converted, said number representing an angle equal to the sum of partial angles represented by said bits respectively, (b) an ordered group of $n$ sine stages associated with said input terminals respectively and each one having an input and an output and including a transformer having a primary and a secondary winding with a transforming ratio equal to the tangent of the angle represented by the corresponding bit, (c) an ordered group of $n$ cosine stages associated with said input terminals respectively and each one having an input and an output and including a transformer having a primary and a secondary winding with a transforming ratio equal to the tangent of the angle represented by the corresponding bit, (d) means for connecting the primary winding of said sine and cosine stage to the output of the next preceding cosine and sine stage respectively, (e) a relay connected to each input terminal for being energized according to the value of the bit received thereon, (f) switching means in said sine and cosine stage operated by said relay for connecting the output of the next preceding stage to the input of the next following stage either directly or through said secondary winding depending on the value of said received bit, (g) a sine output terminal and a cosine output terminal, (h) a source of alternate current having first and second output terminals, (i) means for connecting the ouput of the last sine and cosine stage to said sine and cosine output terminal respectively, (j) and means for connecting the input of the first sine and cosine stage to said first and second output terminals respectively.

3. A digital-to-analog converter according to claim 2, and further comprising means operated by said relay means for connecting compensating impedances to predetermined ones of said transformer windings.

4. A digital-to-analog converter comprising:

(a) $n+m$ input terminals for receiving a group of $n+m$ bits representing in pure binary code a number to be converted, said number representing an angle equal to the sum of partial angles represented by said bits respectively, (b) an ordered group of $n+m$ sine stages associated with said $n+m$ input terminals respectively and each one having an input and an output and including a transformer having a primary and a secondary winding with a transforming ratio equal at least approximately to the tangent of the angle represented by the corresponding bit, the primary winding of said $m$ sine stages being common to said $m$ sine stages, (c) an ordered group of $n+m$ cosine stages associated with said $n+m$ input terminals respectively and each one having an input and an output and including a transformer having an primary and a secondary winding with a transforming ratio equal at least approximately to the tangent of the angle represented by the corresponding bit, the primary winding of said $m$ cosine stages being common to said $m$ cosine stages, (d) means for connecting the primary winding of each one of said $n$ sine and cosine stages to the output of the next preceding cosine and sine stages respectively, (e) a relay connected to each input terminal for being energized according to the value of the bit received thereon, (f) switching means in each one of said sine and cosine stages operated by said relay for connecting the output of the next preceding stage to the input of the next following stage either directly or through said secondary winding depending on the value of said received bit, (g) a sine output terminal and a cosine output terminal, (h) a source of alternate current having first and second output terminals, (i) means for connecting the output of the last of said $m$ sine and cosine stages to said sine and cosine output terminal respectively, (j) means for connecting the input of the first of said $n$ sine and cosine stages to said first and second output terminals respectively, (k) and means for connecting the output of the last of said $n$ sine and cosine stages to the input of the first of said $m$ cosine and sine stages respectively.

5. A digital-to-analog converter according to claim 4, wherein $n=0$.

References Cited

UNITED STATES PATENTS

| | | | |
|---|---|---|---|
| 3,196,430 | 7/1965 | Oken et al. | 340—347 |
| 3,267,265 | 8/1966 | Popodi et al. | 235—154 |
| 3,277,464 | 10/1966 | Naydan et al. | 340—347 |
| 3,325,805 | 6/1967 | Dorey | 340—347 |

MAYNARD R. WILBUR, *Primary Examiner.*

W. J. KOPACZ, *Assistant Examiner.*